United States Patent
Miyamura et al.

(10) Patent No.: US 9,617,627 B2
(45) Date of Patent: Apr. 11, 2017

(54) HEAT-RESISTANT AUSTENITIC STAINLESS STEEL HIGHLY INHIBITED FROM EXFOLIATING SCALE, AND STAINLESS STEEL TUBE

(71) Applicant: Kobe Steel, Ltd., Kobe-shi (JP)

(72) Inventors: Takeo Miyamura, Kobe (JP); Shigenobu Namba, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 250 days.

(21) Appl. No.: 14/365,879

(22) PCT Filed: Dec. 13, 2012

(86) PCT No.: PCT/JP2012/082387
§ 371 (c)(1),
(2) Date: Jun. 16, 2014

(87) PCT Pub. No.: WO2013/099639
PCT Pub. Date: Jul. 4, 2013

(65) Prior Publication Data
US 2014/0356641 A1 Dec. 4, 2014

(30) Foreign Application Priority Data
Dec. 27, 2011 (JP) .................... 2011-286431

(51) Int. Cl.
| | |
|---|---|
| *C22C 38/42* | (2006.01) |
| *C22C 38/48* | (2006.01) |
| *C22C 38/50* | (2006.01) |
| *C22C 38/54* | (2006.01) |
| *C22C 38/58* | (2006.01) |
| *C21D 7/06* | (2006.01) |
| *C22C 38/00* | (2006.01) |
| *C22C 38/02* | (2006.01) |
| *C22C 38/04* | (2006.01) |
| *C21D 6/00* | (2006.01) |
| *C21D 9/08* | (2006.01) |
| *C22C 38/44* | (2006.01) |
| *C22C 38/46* | (2006.01) |
| *C22C 38/52* | (2006.01) |
| *F16L 9/02* | (2006.01) |
| *C21D 8/10* | (2006.01) |

(52) U.S. Cl.
CPC .......... *C22C 38/58* (2013.01); *C21D 6/004* (2013.01); *C21D 7/06* (2013.01); *C21D 9/08* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *F16L 9/02* (2013.01); *C21D 8/10* (2013.01); *C21D 2211/001* (2013.01); *C21D 2211/004* (2013.01); *Y10T 428/12* (2015.01)

(58) Field of Classification Search
None
See application file for complete search history.

(56) References Cited

U.S. PATENT DOCUMENTS

| | | | | |
|---|---|---|---|---|
| 7,731,895 | B2 * | 6/2010 | Okada | ............ C22C 38/02 420/42 |
| 2006/0057414 | A1 | 3/2006 | Matsuo | |
| 2009/0246064 | A1 * | 10/2009 | Minami | ............ C21D 6/002 420/34 |
| 2014/0154128 | A1 | 6/2014 | Miyamura et al. | |

FOREIGN PATENT DOCUMENTS

| | | | |
|---|---|---|---|
| JP | 2-4945 A | 1/1990 | |
| JP | 6 322489 | 11/1994 | |
| JP | EP 1679387 | * 7/2006 | ............ C22C 38/00 |
| JP | 2006 307313 | 11/2006 | |
| JP | 5143960 | 2/2013 | |
| WO | 2008 023410 | 2/2008 | |
| WO | 2011 155296 | 12/2011 | |

OTHER PUBLICATIONS

Machine-English translation of JP2000-328198 A, Senba Mitsuyuki, Nov. 28, 2000.*
Machine-English translation of JP06-322489, Otsuka Nobuo et al., Nov. 22, 1994.*
Extended European Search Report issued on Feb. 1, 2016 in Patent Application No. 12862006.9.
International Search Report Issued Mar. 12, 2013 in PCT/JP12/082387 Filed Dec. 13, 2012.
Written Opinion of the International Searching Authority Issued Mar. 12, 2013 in PCT/JP12/082387 Filed Dec. 13, 2012.

* cited by examiner

*Primary Examiner* — Deborah Yee
(74) *Attorney, Agent, or Firm* — Oblon, McClelland, Maier & Neustadt, L.L.P.

(57) ABSTRACT

This heat-resistant austenitic stainless steel has a specific composition containing Ce and Zr and has an $Hv_1/Hv_0$ ratio of 1.20 or higher, where $Hv_1$ is the average hardness of the area ranging from the surface to a thickness-direction depth of 50 μm and $Hv_0$ is the average hardness of the thickness-direction central part.

20 Claims, No Drawings

HEAT-RESISTANT AUSTENITIC STAINLESS STEEL HIGHLY INHIBITED FROM EXFOLIATING SCALE, AND STAINLESS STEEL TUBE

TECHNICAL FIELD

The present invention relates to heat-resistant austenitic stainless steel used preferably as a material for a heat transfer tube of a boiler, and a stainless steel tube produced from such heat-resistant austenitic stainless steel, and it particularly relates to heat-resistant austenitic stainless steel highly inhibited from exfoliating scale, and a stainless steel tube.

BACKGROUND ART

In recent years, efficiency of coal-fired power generation has been increased in order to suppress emission of carbon dioxide as greenhouse gas. To improve the power generation efficiency, it is effective to increase temperature and pressure of steam in a boiler. A material having excellent high-temperature strength and oxidation resistance is used as a material for the heat transfer tube for such a boiler. In particular, an austenitic stainless steel tube having excellent high temperature strength and oxidation resistance is used in a high temperature site.

The inside of the steel tube is exposed to high temperature steam, resulting in formation of oxidized scale mainly including iron. Hence, the inside of the steel tube is typically further improved in oxidation resistance through shot peening treatment. In light of long-term reliability over at least 10 years, the shot peening treatment is necessary to secure sufficient oxidation resistance despite causing cost increase.

On the other hand, as well known, since austenitic stainless steel is greatly thermally expanded and contracted along with temperature variation, the oxidized scales easily exfoliate due to temperature variation accompanied with start and stop of a thermal power generation plant. If the oxidized scales exfoliate, the exfoliating oxidized scales are deposited on a bent portion of the steel tube, which causes heat transfer trouble. In addition, the oxidized scales may be scattered with vapor up to a generator, leading to breakage of a turbine. Hence, it is important that oxidation resistance is improved and the oxidized scales are less likely to exfoliate, in order to meet the increased vapor temperature. It is therefore necessary to enhance resistance against exfoliation of the oxidized scales to prevent thinning (wastage). There is required a property that inhibits a phenomenon of exfoliation of the oxidized scales (referred to as "scale exfoliating resistance" in the invention) even under such a circumstance.

For example, the Patent Literature 1 discloses a technique of improving steam oxidation resistance by performing particle spray peening treatment onto steel containing a rare earth metal element (REM) added thereto. The Patent Literature 2 proposes a technique of suppressing exfoliation of oxidized scales while improving steam oxidation resistance by controlling surface roughness to be at a certain level or higher after shot peening treatment. The Patent Literature 3 proposes a technique of improving high temperature steam oxidation resistance through shot peening treatment while controlling Cr concentration in steel to be at a certain level or higher.

Among them, each of the techniques of the Patent Literatures 1 and 3 basically suppresses growth rate of scales by shot peening treatment, and therefore does not necessarily provide a sufficient effect of suppressing exfoliation of oxidized scales accompanied with start and stop of a power generation plant. The technique of the Patent Literature 2 advantageously suppresses exfoliation of the oxidized scales by controlling surface roughness of a surface subjected to shot peening. However, since repeated exfoliation of the oxidized scales gradually reduces initial roughness of a steel surface, such an effect cannot be continuously exhibited against the repeated exfoliation of the oxidized scales, and consequently sufficient properties cannot be maintained for a long period.

In this way, existing techniques of suppressing exfoliation of the oxidized scales include a technique of preventing formation of oxidized scale itself (the Patent Literatures 1 and 3) and a technique of preventing exfoliation of formed oxidized scales (the Patent Literature 2). The technique that prevents formation of oxidized scales themselves merely reduces a growth rate of scales, and does not guarantee prevention of formation of oxidized scales over a long period such as several decades. It is therefore necessary to prepare a measure for a case where the oxidized scales are formed. It is therefore necessary to provide the technique of preventing exfoliation of formed oxidized scales, but the relevant existing techniques cannot actually exhibit continuous effects on repeating exfoliation of the oxidized scales.

CITATION LIST

Patent Literature

Patent Literature 1: Japanese Unexamined Patent Application Publication No. JP6-322489.
Patent Literature 2: Japanese Unexamined Patent Application Publication No. JP2006-307313.
Patent Literature 3: Re-publication of PCT International Publication No. WO2008-023410.

SUMMARY OF THE INVENTION

Problems that the Invention is to Solve

An object of the invention, which has been accomplished in light of such a situation, is to provide an austenitic stainless steel improved in scale exfoliating resistance of its inside, which is usable for a steel tube having an inner face treated with shot peening or the like among heat transfer tubes used in a thermal power generation plant, and provide a stainless steel tube produced from such stainless steel.

Means for Solving the Problems

The above-described issue is solved by a heat-resistant austenitic stainless steel of the invention, including: C: 0.02 to 0.2% (means mass percent for chemical composition here and hereinafter); Si: 0.1 to 1.5%; Mn: 0.1 to 3%; Ni: 7 to 13%; Cr: 16 to 20%; Cu: 0.4 to 4%; Nb: 0.05 to 0.6%; Ti: 0.05 to 0.6%; Zr: 0.05 to 0.35%; Ce: 0.005 to 0.1%; B: 0.0005 to 0.005%; N: 0.001 to 0.15%; S: 0.05% or less (not including 0%); P: 0.05% or less (not including 0%); and a remainder consisting of iron and unavoidable impurities, the heat-resistant austenitic stainless steel being summarized in that a ratio ($Hv_1/Hv_0$) of average hardness ($Hv_1$) of a region from a surface to a depth of 50 μm in a thickness direction to average hardness ($Hv_0$) at the center in the thickness direction is 1.20 or more.

It is also useful that the heat-resistant austenitic stainless steel of the invention further contains optionally (a) at least one selected from a group consisting of Co: 3% or less (not including 0%), Mo: 3% or less (not including 0%), and W: 5% or less (not including 0%), (b) Ca: 0.005% or less (not including 0%) and/or Mg: 0.005% or less (not including 0%), and (c) at least one selected from a group consisting of V: 0.6% or less (not including 0%), Ta: 0.6% or less (not including 0%), and Hf: 0.6% or less (not including 0%). The properties of the heat-resistant austenitic stainless steel are further improved depending on such contained components.

A stainless steel tube produced from the heat-resistant austenitic stainless steel as described above is extremely useful for a heat transfer tube in a thermal power generation plant.

Advantageous Effects of the Invention

In the heat-resistant austenitic stainless steel of the invention, oxidized scales are less likely to exfoliate even after being repeatedly subjected to temperature variation accompanied with start and stop of a thermal power generation plant. In addition, when the heat-resistant austenitic stainless steel is used for a heat transfer tube, scattering of oxidized scales can be suppressed in the inside of the tube, and consequently blockade of the heat transfer tube and damage of a turbine can be reduced.

MODE FOR CARRYING OUT THE INVENTION

To achieve continuous scale exfoliating resistance against repeating exfoliation of oxidized scales, the inventors have made investigations from various angles on a relationship between scale exfoliating resistance and a chemical composition of a surface of a steel having surface hardness increased by treatment such as shot peening. As a result, the inventors have found that an austenitic stainless steel having a chemical composition comparable with that of 18Cr-8Ni austenitic stainless steel is adjusted to contain a predetermined amount of each of Zr and Ce, and a surface of the austenitic stainless steel is treated with shot peening or the like, thereby the austenitic stainless steel exhibits extremely excellent scale exfoliating resistance, and eventually have accomplished the present invention.

The heat-resistant austenitic stainless steel of the invention is characterized in that a predetermined amount of each of Zr and Ce is contained therein, and hardness of a region near a surface is controlled to satisfy a certain condition by shot peening treatment or the like. Reasons for determining the amount of each of Zr and Ce and a range of the surface hardness (a range of a hardness ratio) are as follows.

The adjustment of the chemical composition through addition of Zr and Ce and an increase in surface hardness by shot peening treatment or the like provide an effect of suppressing exfoliation of oxidized scales through synergistic effect of them. Zr should be contained 0.05% or more to provide such a synergistic effect. However, an excessive Zr content causes formation of coarse inclusions that worsen a surface texture and toughness of the steel (or steel tube). Hence, the upper limit of the Zr content should be 0.35% or less. Ce should be contained 0.005% or more to provide its effect. However, if the Ce content is excessive to exceed 0.1%, cost increases from an economical point of view.

Since steel cost increases by addition of Zr and Ce, an appropriate content should be determined in consideration of the balance between the effects provided by the contained Zr and Ce and increased cost. From such a viewpoint, a preferred lower limit of the Zr content is 0.10% or more (more preferably, 0.15% or more), and a preferred upper limit thereof is 0.3% or less (more preferably, 0.25% or less). A preferred lower limit of the Ce content is 0.01% or more (more preferably, 0.015% or more), and a preferred upper limit thereof is 0.05% or less (more preferably, 0.03% or less).

While pure Ce is used as the Ce source, the necessary content of Ce may be added using a Ce-containing matrix alloy or a Ce-containing misch metal being separately prepared. Even if La, Nd, Pr, etc. contained in the misch metal are each contained as an impurity in the steel at a concentration lower than that of Ce, this is not disadvantageous. On the contrary, use of the matrix alloy or the misch metal makes it possible to simplify handling during melt operation compared with use of pure Ce to be easily oxidized.

The techniques of the Patent Literatures 1 and 3 among the existing techniques can each improve oxidation resistance through shot peening treatment. However, such techniques are different from the invention in that they do not exhibit the synergistic effect due to the combination with the steel composition effective for scale exfoliating resistance, and provide insufficient effects on scale exfoliating resistance. Although the Patent Literature 2 discloses the technique of improving scale exfoliating resistance as with the invention, such an effect is based on surface roughness of steel; hence, if scales exfoliate repeatedly, such surface roughness is lost, and the effect cannot be continuously exhibited for a long time even if the layer subjected to shot peening remains. The invention specifies a chemical composition instead of surface morphology. Hence, as long as the layer subjected to shot peening remains, the effect of the invention can be exhibited even if scales exfoliate repeatedly.

In the heat-resistant austenitic stainless steel of the invention, it is important that average hardness ($Hv_1$) of the region near the surface (the region from the surface to a depth of 50 μm in a thickness direction) is higher by at least a certain hardness than average hardness of a matrix material (i.e., average hardness at the center in the thickness direction as a position at which properties of the matrix material are shown: $Hv_0$). From such a viewpoint, the ratio ($Hv_1/Hv_0$) of the average hardness ($Hv_1$) of the region near the surface to the average hardness ($Hv_0$) of the matrix material should be 1.20 or more. If the value of the ratio ($Hv_1/Hv_0$) is less than 1.20, the scale exfoliating resistance due to the synergistic effect with addition of Ce and Zr is not sufficiently achieved, and the effect of suppressing growth of oxidized scales as an existing technique is also not provided.

The value of the ratio ($Hv_1/Hv_0$) is preferably 1.5 or more, and more preferably 1.8 or more. The upper limit of the value of the ratio ($Hv_1/Hv_0$) is about 2.5 for the heat-resistant austenitic stainless steel of the invention. One reason for specifying the region near the surface to be "a region from the surface to a depth of 50 μm in a thickness direction" in the invention is that the region corresponds to a range in which hardness is evidently increased.

While the addition of Zr and Ce and the control of surface hardness described above are important requirements in the heat-resistant austenitic stainless steel of the invention, the chemical composition of each of elements other than Zr and Ce (C, Si, Mn, Ni, Cr, Cu, Nb, Ti, B, N, S, and P) should also be controlled appropriately. The effect and the reason for determining the content range of each of the elements are as described below.

[C: 0.02 to 0.2%]

C is an element that forms carbides in a high temperature working circumstance and has an effect of improving high temperature strength and creep strength necessary for the heat transfer tube, and should be contained 0.02% or more to ensure the amount of carbide precipitates that work as a strengthening mechanism. However, if the C content is excessive to exceed 0.2%, it goes beyond the solid solubility limit and coarse carbides are formed, resulting in no further strengthening. A preferred lower limit of the C content is 0.05% or more (more preferably, 0.09% or more). A preferred upper limit thereof is 0.18% or less (more preferably, 0.15% or less).

[Si: 0.1 to 1.5%]

Si is an element having a deoxidation effect in molten steel. Si is effective for improving the oxidation resistance even if it is contained in a slight amount. The Si content should be 0.1% or more in order to provide such effects. However, an excessive Si content of more than 1.5% causes reduction in toughness. A preferred lower limit of the Si content is 0.2% or more (more preferably, 0.3% or more). A preferred upper limit thereof is 0.9% or less (more preferably, 0.8% or less).

[Mn: 0.1 to 3%]

Mn is an element having a deoxidation effect in molten steel as with Si, and has an effect of stabilizing austenite. The Mn content should be 0.1% or more in order to provide such effects. However, an excessive Mn content of more than 3% causes deterioration of hot workability. A preferred lower limit of the Mn content is 0.2% or more (more preferably, 0.3% or more). A preferred upper limit thereof is 2.0% or less (more preferably, 1.8% or less).

[Ni: 7 to 13%]

Ni has an effect of stabilizing austenite, and should be contained 7% or more in order to maintain an austenite phase. However, an excessive Ni content of more than 13% causes cost increase. A preferred lower limit of the Ni content is 8.0% or more (more preferably, 9.0% or more). A preferred upper limit thereof is 12.0% or less (more preferably, 11.0% or less).

[Cr: 16 to 20%]

Cr is an essential element for providing corrosion resistance as stainless steel. Cr should be contained 16% or more in order to provide such an effect. However, if the Cr content is excessive to exceed 20%, austenite becomes unstable at high temperature, and high temperature strength is lowered. A preferred lower limit of the Cr content is 16.5% or more (more preferably, 17.0% or more). A preferred upper limit thereof is 19.5% or less (more preferably, 19.0% or less).

[Cu: 0.4 to 4%]

Cu forms fine precipitates in steel and extremely increases high temperature creep strength as one of principal strengthening mechanisms of stainless steel. The Cu content should be 0.4% or more in order to provide such an effect. However, if the Cu content is excessive to exceed 4%, such an effect is saturated. A preferred lower limit of the Cu content is 1.0% or more (more preferably, 1.5% or more). A preferred upper limit thereof is 3.7% or less (more preferably, 3.5% or less).

[Nb: 0.05 to 0.6%]

Nb is an element effective for increasing high temperature strength through precipitation of carbonitrides (carbides, nitrides, or carbonitrides). Such precipitates suppress coarsening of crystal grains and accelerate diffusion of Cr, and therefore Nb subsidiarily provides an effect of improving corrosion resistance. Nb should be contained 0.05% or more in order to ensure a required precipitation amount. However, an excessive Nb content of more than 0.6% causes coarsening of the precipitates, leading to reduction in toughness. A preferred lower limit of the Nb content is 0.10% or more (more preferably, 0.15% or more). A preferred upper limit thereof is 0.5% or less (more preferably, 0.3% or less).

[Ti: 0.05 to 0.6%]

Ti also provides effects similar to those of Nb. When Ti is added with Nb and Zr, the precipitates are further stabilized, and high temperature strength is effectively maintained for a long period. The Ti content should be 0.05% or more in order to effectively provide such effects. However, if the Ti content is excessive, the precipitates are coarsened and toughness is reduced as with Nb; hence, the Ti content should be 0.6% or less. A preferred lower limit of the Ti content is 0.10% or more (more preferably, 0.15% or more). A preferred upper limit thereof is 0.5% or less (more preferably, 0.3% or less).

[B: 0.0005 to 0.005%]

B is solid-solubilized in steel, and thus has an effect of accelerating formation of M23C6 type carbides (M is carbide-forming elements) as one of the principle strengthening mechanisms. The B content should be 0.0005% or more in order to effectively provide such an effect. However, an excessive B content causes degradation of hot workability and weldability; hence, the B content should be 0.005% or less. A preferred lower limit of the B content is 0.001% or more (more preferably, 0.0012% or more). A preferred upper limit thereof is 0.004% or less (more preferably, 0.003% or less).

[N: 0.001 to 0.15%]

N is solid-solubilized in steel, and thus has an effect of improving high temperature strength through solid-solution strengthening. In addition, N is an element effective for improving high temperature strength through formation of nitrides with Cr or Nb under high temperature loading for a long period. The N content should be 0.001% or more in order to effectively provide such effects. However, an excessive N content of more than 0.15% causes deterioration of hot workability. A preferred lower limit of the N content is 0.002% or more (more preferably, 0.003% or more). A preferred upper limit thereof is 0.05% or less (more preferably, 0.02% or less).

[S: 0.005% or Less (Not Including 0%)]

S is an unavoidable impurity, and causes deterioration of hot workability if the content of S is high. Hence, the S content should be 0.005% or less. In addition, S fixes Ce as sulfides to impair the effect given by addition of Ce. Hence, the S content is preferably controlled to be 0.002% or less (more preferably 0.001% or less).

[P: 0.05% or Less (Not Including 0%)]

P is an unavoidable impurity, and impairs weldability if the content of P is high. Hence, the P content should be 0.05% or less. The P content is preferably controlled to be 0.04% or less (more preferably 0.03% or less).

The contained elements are specified in the invention as described above. The remainder consists of iron and unavoidable impurities. The unavoidable impurities may include elements that are introduced depending on starting materials, other materials, and situations of production facilities, etc., and rare earth elements (REM) other than Ce, such as La, Nd, and Pr, the rare earth elements being mixedly added when Ce is added using rare earth elements. Impurity metals of low melting point such as Sn, Pb, Sb, As, and Zn derived from scrap materials lower grain boundary strength during hot working or during use in high temperature circumstance. Hence, such impurity metals are each desirably at a lower concentration in order to improve embrittlement crack resistance and hot workability. The steel of the invention may optionally contain the following components, and the properties of the steel are further improved depending on the elements to be contained.

[At Least One Selected from a Group Consisting of Co: 3% or Less (Not Including 0%), Mo: 3% or Less (Not Including 0%), and W: 5% or Less (Not Including 0%)]

Co, Mo, and W, which each have an effect of increasing high temperature strength through solid solution strengthening, can be optionally contained so that the high temperature strength is further increased. Although Co has an effect of stabilizing austenite as with Ni, if the content of Co exceeds 3%, Co as a radioactive element contaminates a melting furnace. Hence, the Co content is preferably 3% or less. More preferably, the Co content is 2.5% or less (most preferably 2.0% or less). If the Mo content is excessive, hot workability is impaired; hence the Mo content is preferably 3% or less. More preferably, the Mo content is 2.5% or less (most preferably 2.0% or less). If the W content is excessive, coarse intermetallic compounds are formed and high temperature ductility is lowered. Hence, the W content is preferably 5% or less. More preferably, the W content is 4.5% or less (most preferably 4.0% or less).

To effectively provide the above-described effects, the lower limit of the content is 0.1% or more (most preferably 0.5% or more) for Co, 0.1% or more (most preferably 0.5% or more) for Mo, and 0.1% or more (most preferably 1.0% or more) for W. However, when such elements are contained, the above-described effects are exhibited, but cost increases on the other hand. Hence, the content of each of the elements should be determined in accordance with a required strengthening level and allowable cost.

[Ca: 0.005% or Less (Not Including 0%) and/or Mg: 0.005% or Less (Not Including 0%)]

Ca and Mg each react with sulfur in molten steel and form sulfides, and thus can each reduce sulfur concentration in steel and improve hot ductility. If each of the elements is contained more than 0.005%, restrictions in operation occur, such as bumping of molten steel during melt operation; hence, the upper limit of the content of each element is determined as 0.005%. Preferably, the upper limit is 0.002% or less.

[At Least One Selected from a Group Consisting of V: 0.6% or Less (Not Including 0%), Ta: 0.6% or Less (Not Including 0%), and Hf: 0.6% or Less (Not Including 0%)]

V, Ta, and Hf, which are elements that form carbides and/or nitrides, can each be optionally added to the composition specified in the invention so that high temperature strength is increased. If the content of any of such elements is less than 0.05%, the effect is not sufficiently provided. If the content exceeds 0.6%, the precipitates become excessive to impair hot workability. A preferred lower limit of the content is 0.10% or more (more preferably, 0.15% or more). A preferred upper limit thereof is 0.5% or less (more preferably, 0.3% or less).

In general, a method of improving oxidation resistance includes a technique of refining crystal grain size of a matrix material. However, in the case where hardness of a region near a surface is modified by shot peening treatment as with the heat-resistant austenitic stainless steel of the invention, since the modified layer is mainly responsible for improvement in oxidation resistance and in scale exfoliating resistance, the crystal grain size of the matrix material may not be necessarily maintained to be fine. Hence, in addition to the shot peening treatment according to the invention, the crystal grain size of the microstructure of the matrix material is adjusted to less than 7 in terms of the ASTM (American Society for Testing and Materials) grain size number, thereby high temperature creep strength can be increased while the oxidation resistance and the scale exfoliating resistance are improved. If the grain size number is 7 or more, although the improvement in scale exfoliating resistance according to the invention is achieved, high temperature strength is not increased. The grain size number is defined by ASTM and means a grain size number calculated by a counting method (Planimetric method). The grain size number is more preferably 6 or less, and most preferably 5 or less.

The range of the crystal grain size as described above is obtained by controlling the added amount of components contributing to pinning at a crystal grain boundary, conditions of hot and cold working such as drawing and extrusion in a pipe production process, and heat treatment conditions. The optimal condition of each of them varies depending on the three factors. For example, in order to refine the crystal grain size, it is necessary to increase added amount of elements to be precipitated, increase a working ratio, and decrease the heat treatment temperature. The hot and cold working is applied to control the pipe thickness, and introduce strains to condition the crystal grain structure through heat treatment after the working. Typically, the hot and cold working is performed at a reduction ratio of 30% or more. The heat treatment is applied to remove strains, and is performed in a temperature range of substantially 1000° C. or higher and lower than 1300° C. For example, in the case of the reduction ratio of about 35%, the specified grain size range can be obtained by setting the heat treatment temperature to 1200° C. or higher, preferably 1250° C. or higher, and more preferably 1300° C. or higher. However, this condition unlimitedly varies depending on a balance between precipitated components, working, and heat treatment.

As a method of controlling hardness of the region near the surface according to the invention, the shot peening treatment is desirable and is typically performed by spraying particles, so-called projection material (shot particles), of martensite steel, alumina, or zirconia having a diameter of several tens of micrometers to several millimeters to an object at an appropriate pressure of about 10 kgf/cm$^2$ (0.98 MPa) or less. However, surface machining such as cutting, polishing, and grinding or shot blast treatment may also be, but not limitedly, used to essentially achieve the above-described hardness ratio.

The above-described heat-resistant austenitic stainless steel is used to produce a heat transfer tube for a boiler, thereby scale exfoliating is less likely to occur even after repeated temperature variation. In production of the heat transfer tube, the surface, the neighborhood of which is increased in hardness, is designed to be an inner surface (inner circumferential face). The heat-resistant austenitic stainless steel of the invention is assumed to be formed into steel tubes and to have a thickness of about 5 to 20 mm.

The present invention is now described more specifically with reference to Examples. The invention is not restricted by the following Examples, and it will be appreciated that the invention can be practiced with appropriate modification within a range that can conform to the purport described above and to be described later, and each of them is included in the technical scope of the invention.

EXAMPLES

Example 1

Various types of steel materials (steel types A to X) having chemical compositions shown in Tables 1 and 2 were melted in a vacuum melting furnace (VIF) into 20 kg ingots. The ingots were then hot-forged into 120 mm width×20 mm thickness and subjected to heat treatment at 1250° C., and were then cold-rolled into 13 mm thickness. Subsequently, such cold-rolled materials were subjected to heat treatment again at 1200° C. for 5 min to provide matrix materials. A steel material of 20 mm×30 mm×2 mm was cut out from each matrix material by machining, and the surface of the steel material was smoothed and mirror-finished by polishing using emery paper and by buff polishing using diamond abrasive grains to prepare specimens.

Among the steel materials shown in Tables 1 and 2, steel types A to Q are steel materials that satisfy the requirements specified in the invention (inventive steel), and steel types R to X are steel materials out of the requirements specified in the invention (comparative steel). Steel types J and K are steel materials that contain Ce added using misch metal, and contain La and Nd as impurities.

In the repeating oxidation test, samples were carried into and out of a furnace at 1000° C. in air at a cycle of furnace heating for 25 min and cooling for 10 min in air. Such heating and cooling were repeated up to 80 cycles. After the repeating oxidation test, mass change of each specimen was measured by an electronic balance, and the weight loss (mg·cm$^{-2}$) of each steel material was calculated.

The average hardness ($Hv_1$) of the region near the surface (the region from the surface to a depth of 50 µm in the thickness direction) and the average hardness of the matrix material (average hardness at the center in the thickness direction: $Hv_0$) were measured according to the following procedure, and a ratio of hardness ($Hv_1/Hv_0$) was determined.

[Measuring Procedure of Average Hardness $Hv_1$ and $Hv_0$]

Hardness was measured at three points at 1 mm intervals in a direction perpendicular to the thickness direction in a thickness center portion, and such measured values were

TABLE 1

| Steel type | Chemical composition* (mass %) | | | | | | | | | | | | | | |
|---|---|---|---|---|---|---|---|---|---|---|---|---|---|---|---|
| | C | Si | Mn | P | S | Ni | Cr | Cu | Nb | Ti | Zr | Ce | B | N | Others |
| A | 0.09 | 0.30 | 1.58 | 0.026 | 0.002 | 9.7 | 18.4 | 3.0 | 0.19 | 0.20 | 0.19 | 0.016 | 0.0020 | 0.009 | — |
| B | 0.14 | 0.30 | 1.42 | 0.021 | 0.001 | 10.6 | 18.7 | 3.0 | 0.27 | 0.28 | 0.15 | 0.013 | 0.0028 | 0.024 | — |
| C | 0.12 | 0.49 | 1.81 | 0.025 | 0.001 | 9.8 | 17.9 | 2.6 | 0.35 | 0.11 | 0.32 | 0.020 | 0.0032 | 0.062 | — |
| D | 0.10 | 0.15 | 1.80 | 0.032 | 0.004 | 9.0 | 17.5 | 3.1 | 0.23 | 0.26 | 0.08 | 0.008 | 0.0015 | 0.019 | — |
| E | 0.10 | 0.32 | 1.26 | 0.029 | 0.003 | 9.9 | 18.6 | 2.7 | 0.12 | 0.33 | 0.27 | 0.017 | 0.0019 | 0.004 | — |
| F | 0.09 | 0.75 | 0.77 | 0.015 | 0.002 | 9.4 | 18.9 | 2.9 | 0.13 | 0.14 | 0.13 | 0.035 | 0.0011 | 0.013 | — |
| G | 0.07 | 0.54 | 1.32 | 0.020 | 0.001 | 10.1 | 18.0 | 2.9 | 0.52 | 0.07 | 0.16 | 0.018 | 0.0014 | 0.011 | — |
| H | 0.09 | 0.96 | 1.87 | 0.012 | 0.002 | 9.6 | 17.9 | 3.1 | 0.06 | 0.54 | 0.17 | 0.013 | 0.0025 | 0.017 | — |
| I | 0.03 | 1.35 | 2.50 | 0.028 | 0.002 | 10.3 | 18.0 | 3.4 | 0.16 | 0.17 | 0.17 | 0.027 | 0.0028 | 0.082 | — |
| J | 0.06 | 0.24 | 2.87 | 0.043 | 0.004 | 8.5 | 18.3 | 3.1 | 0.18 | 0.15 | 0.21 | 0.027 | 0.0019 | 0.034 | La: 0.01, Nd: 0.01 |
| K | 0.12 | 0.67 | 0.34 | 0.033 | 0.003 | 11.3 | 16.3 | 1.4 | 0.48 | 0.09 | 0.10 | 0.048 | 0.0021 | 0.130 | La: 0.02, Nd: 0.01 |
| L | 0.11 | 0.43 | 1.05 | 0.038 | 0.001 | 12.4 | 17.2 | 1.9 | 0.08 | 0.43 | 0.09 | 0.006 | 0.0044 | 0.013 | Co: 0.2, V: 0.4 |

*Remainder: iron and unavoidable impurities other than P and S

TABLE 2

| Steel type | Chemical composition* (mass %) | | | | | | | | | | | | | | |
|---|---|---|---|---|---|---|---|---|---|---|---|---|---|---|---|
| | C | Si | Mn | P | S | Ni | Cr | Cu | Nb | Ti | Zr | Ce | B | N | Others |
| M | 0.11 | 0.32 | 2.10 | 0.017 | 0.003 | 7.7 | 16.9 | 2.3 | 0.36 | 0.38 | 0.06 | 0.07 | 0.0006 | 0.021 | W: 0.8, Ta: 0.2 |
| N | 0.09 | 0.65 | 1.34 | 0.021 | 0.001 | 10.4 | 18.0 | 2.2 | 0.14 | 0.30 | 0.11 | 0.034 | 0.0011 | 0.019 | Mo: 0.5, Ca: 0.0004 |
| O | 0.07 | 0.78 | 0.95 | 0.018 | 0.004 | 9.3 | 19.7 | 3.3 | 0.17 | 0.25 | 0.08 | 0.021 | 0.0023 | 0.015 | Ca: 0.0007, Mg: 0.0019 |
| P | 0.13 | 0.34 | 1.23 | 0.024 | 0.002 | 8.9 | 17.3 | 2.8 | 0.23 | 0.09 | 0.18 | 0.01 | 0.0020 | 0.012 | Mg: 0.0005, Hf: 0.3 |
| Q | 0.12 | 0.32 | 1.11 | 0.022 | 0.003 | 11.6 | 16.9 | 3.2 | 0.15 | 0.17 | 0.12 | 0.014 | 0.0014 | 0.014 | Ca: 0.0022, V: 0.2 |
| R | 0.10 | 0.32 | 1.56 | 0.024 | 0.005 | 9.5 | 18.0 | 3.1 | 0.27 | 0.19 | — | — | 0.0018 | 0.011 | — |
| S | 0.06 | 0.25 | 1.50 | 0.031 | 0.002 | 9.3 | 18.1 | 3.1 | 0.19 | 0.16 | 0.15 | ≤0.001 | 0.0022 | 0.015 | — |
| T | 0.11 | 0.29 | 1.48 | 0.031 | 0.002 | 9.3 | 18.1 | 3.0 | 0.19 | 0.21 | 0.01 | 0.003 | 0.0022 | 0.023 | — |
| U | 0.12 | 0.45 | 1.45 | 0.022 | 0.001 | 9.5 | 18.2 | 3.2 | 0.17 | 0.23 | 0.03 | 0.023 | 0.0028 | 0.043 | — |
| V | 0.09 | 0.55 | 0.98 | 0.017 | 0.003 | 9.8 | 19.0 | 3.0 | 0.26 | 0.21 | 0.12 | 0.002 | 0.0021 | 0.021 | — |
| W | 0.10 | 0.19 | 0.73 | 0.030 | 0.003 | 9.2 | 18.0 | 3.1 | 0.38 | — | — | — | 0.0018 | 0.110 | — |
| X | 0.05 | 0.40 | 1.82 | 0.032 | 0.002 | 8.4 | 18.5 | 0.3 | — | — | — | — | ≤0.0001 | 0.059 | — |

*Remainder: iron and unavoidable impurities other than P and S

The resultant steel materials were subjected to shot peening treatment using alumina particles (shot particle size: 100 µm) in four levels of spray pressure of 1, 2, 4, and 6 kgf/cm$^2$. A section of a dummy sample was mirror-polished. Subsequently, each steel material was subjected to measurement of a ratio of average hardness ($Hv_1$) of a region from a surface to a depth of 50 µm in a thickness direction to average hardness ($Hv_0$) at the center of the steel material in the thickness direction. Such various test specimens were subjected to a repeating oxidation test to determine weight loss (mass decrease amount).

averaged to determine the average hardness ($Hv_0$) of the matrix material. In addition, hardness was measured at three points at equal intervals from an uppermost surface to a depth of 50 µm in the thickness direction on a cross section, and such three data were averaged to determine the average hardness ($Hv_1$) of the region near the surface.

The results of such measurement (average hardness $Hv_1$ and $Hv_0$, hardness ratio ($Hv_1/Hv_0$), and weight loss) are shown in Tables 3 to 5 (specimen Nos. 1 to 96). In Tables 3 to 5, underlined hardness ratios ($Hv_1/Hv_0$) refer to those out of the range specified in the invention. The data of the same steel type sequentially show results in the four levels of spray pressure of 1, 2, 4, and 6 kgf/cm² from top to bottom (for example, specimen Nos. 1 to 4).

TABLE 3

| Specimen No. | Steel type | Average hardness $Hv_1$ (Hv) | Average hardness $Hv_0$ (Hv) | Hardness ratio ($Hv_1/Hv_0$) | Weight loss (mg·cm$^{-2}$) |
|---|---|---|---|---|---|
| 1 | A | 159 | 151 | 1.05 | 186 |
| 2 | | 192 | 142 | 1.35 | 70 |
| 3 | | 257 | 155 | 1.66 | 9 |
| 4 | | 321 | 162 | 1.98 | 6 |
| 5 | B | 184 | 172 | 1.07 | 198 |
| 6 | | 232 | 169 | 1.37 | 96 |
| 7 | | 281 | 168 | 1.67 | 23 |
| 8 | | 345 | 169 | 2.04 | 13 |
| 9 | C | 161 | 145 | 1.11 | 167 |
| 10 | | 234 | 152 | 1.54 | 65 |
| 11 | | 248 | 141 | 1.76 | 7 |
| 12 | | 311 | 146 | 2.13 | 5 |
| 13 | D | 148 | 145 | 1.02 | 206 |
| 14 | | 201 | 152 | 1.32 | 102 |
| 15 | | 259 | 156 | 1.66 | 32 |
| 16 | | 295 | 149 | 1.98 | 15 |
| 17 | E | 186 | 162 | 1.15 | 181 |
| 18 | | 201 | 157 | 1.28 | 68 |
| 19 | | 230 | 150 | 1.53 | 11 |
| 20 | | 312 | 164 | 1.90 | 8 |
| 21 | F | 173 | 157 | 1.10 | 168 |
| 22 | | 197 | 141 | 1.40 | 62 |
| 23 | | 238 | 145 | 1.64 | 6 |
| 24 | | 291 | 149 | 1.95 | 5 |
| 25 | G | 147 | 134 | 1.10 | 188 |
| 26 | | 212 | 148 | 1.43 | 74 |
| 27 | | 258 | 146 | 1.71 | 11 |
| 28 | | 323 | 151 | 2.07 | 7 |
| 29 | H | 161 | 156 | 1.03 | 192 |
| 30 | | 196 | 151 | 1.30 | 91 |
| 31 | | 258 | 163 | 1.58 | 19 |
| 32 | | 291 | 154 | 1.89 | 12 |

TABLE 4

| Specimen No. | Steel type | Average hardness $Hv_1$ (Hv) | Average hardness $Hv_0$ (Hv) | Hardness ratio ($Hv_1/Hv_0$) | Weight loss (mg·cm$^{-2}$) |
|---|---|---|---|---|---|
| 33 | I | 141 | 132 | 1.07 | 173 |
| 34 | | 188 | 141 | 1.33 | 71 |
| 35 | | 218 | 137 | 1.59 | 20 |
| 36 | | 248 | 128 | 1.94 | 11 |
| 37 | J | 161 | 145 | 1.11 | 171 |
| 38 | | 211 | 152 | 1.39 | 67 |
| 39 | | 236 | 144 | 1.64 | 16 |
| 40 | | 324 | 161 | 2.01 | 8 |
| 41 | K | 188 | 165 | 1.14 | 152 |
| 42 | | 218 | 158 | 1.38 | 54 |
| 43 | | 286 | 171 | 1.67 | 14 |
| 44 | | 337 | 162 | 2.08 | 5 |
| 45 | L | 168 | 154 | 1.09 | 201 |
| 46 | | 191 | 148 | 1.29 | 95 |
| 47 | | 256 | 159 | 1.61 | 27 |
| 48 | | 281 | 141 | 1.99 | 21 |
| 49 | M | 164 | 158 | 1.04 | 157 |
| 50 | | 211 | 166 | 1.27 | 57 |
| 51 | | 279 | 169 | 1.65 | 12 |
| 52 | | 324 | 161 | 2.01 | 4 |
| 53 | N | 148 | 145 | 1.02 | 162 |
| 54 | | 202 | 151 | 1.34 | 73 |
| 55 | | 261 | 156 | 1.67 | 9 |
| 56 | | 283 | 143 | 1.98 | 7 |
| 57 | O | 165 | 151 | 1.09 | 183 |
| 58 | | 203 | 149 | 1.36 | 81 |
| 59 | | 265 | 155 | 1.71 | 23 |
| 60 | | 328 | 159 | 2.06 | 14 |
| 61 | P | 174 | 164 | 1.06 | 186 |
| 62 | | 224 | 171 | 1.31 | 83 |
| 63 | | 258 | 160 | 1.61 | 16 |
| 64 | | 338 | 169 | 2.00 | 8 |

TABLE 5

| Specimen No. | Steel type | Average hardness $Hv_1$ (Hv) | Average hardness $Hv_0$ (Hv) | Hardness ratio ($Hv_1/Hv_0$) | Weight loss (mg·cm$^{-2}$) |
|---|---|---|---|---|---|
| 65 | Q | 172 | 158 | 1.09 | 193 |
| 66 | | 208 | 161 | 1.29 | 91 |
| 67 | | 262 | 154 | 1.70 | 24 |
| 68 | | 356 | 168 | 2.12 | 15 |
| 69 | R | 165 | 151 | 1.09 | 232 |
| 70 | | 200 | 148 | 1.35 | 198 |
| 71 | | 280 | 159 | 1.76 | 143 |
| 72 | | 326 | 155 | 2.10 | 129 |
| 73 | S | 145 | 141 | 1.03 | 223 |
| 74 | | 204 | 152 | 1.34 | 186 |
| 75 | | 244 | 148 | 1.65 | 134 |
| 76 | | 307 | 155 | 1.98 | 119 |
| 77 | T | 160 | 148 | 1.08 | 225 |
| 78 | | 179 | 139 | 1.29 | 199 |
| 79 | | 257 | 152 | 1.69 | 167 |
| 80 | | 321 | 158 | 2.03 | 147 |
| 81 | U | 185 | 165 | 1.12 | 221 |
| 82 | | 219 | 175 | 1.25 | 193 |
| 83 | | 241 | 166 | 1.45 | 156 |
| 84 | | 304 | 161 | 1.89 | 138 |
| 85 | V | 159 | 154 | 1.03 | 233 |
| 86 | | 194 | 149 | 1.30 | 195 |
| 87 | | 257 | 150 | 1.71 | 149 |
| 88 | | 305 | 145 | 2.10 | 141 |
| 89 | W | 152 | 138 | 1.10 | 229 |
| 90 | | 191 | 145 | 1.32 | 205 |
| 91 | | 236 | 131 | 1.80 | 159 |
| 92 | | 314 | 149 | 2.11 | 144 |
| 93 | X | 145 | 141 | 1.03 | 334 |
| 94 | | 167 | 138 | 1.21 | 267 |
| 95 | | 219 | 151 | 1.45 | 202 |
| 96 | | 258 | 142 | 1.82 | 189 |

These results suggest the following findings. Even in samples using steel types R to X out of the chemical composition specified in the invention, for example, specimen Nos. 69 to 72 using the steel type R show that weight loss is reduced from 232 mg·cm$^{-2}$ to 129 mg·cm$^{-2}$, i.e., mass decrease is reduced by 103 mg·cm$^{-2}$. This shows that the increased surface hardness caused by shot peening treatment has a certain effect on reduction in mass decrease regardless of the chemical composition.

In samples that do not sufficiently suffer from the effect of shot peening and are each substantially equivalent to an untreated sample (numerical values in the uppermost columns of the steel types), when samples of the steel types A to Q are compared with samples of the steel types R to X, respectively, it is obvious that even if a sample is equivalent to a sample being substantially not subjected to shot peening treatment, a certain improvement effect is obtained by controlling the chemical composition to be within the range specified in the invention. For example, when specimen No. 1 is compared to specimen No. 69, and when the chemical composition of the steel type R is assumed to be changed into the chemical composition of the steel type A, mass decrease can be reduced by 46 mg·cm$^{-2}$, i.e., reduced from 232 mg·cm$^{-2}$ to 186 mg·cm$^{-2}$.

In the case where both the surface hardness provided by shot peening treatment and the chemical composition as the requirements of the invention are controlled to be within the ranges specified in the invention, remarkable improvement effects, which are not obtained by only one of the requirements, are obtained (specimen Nos. 2 to 4, 6 to 8, 10 to 12, 14 to 16, 18 to 20, 22 to 24, 26 to 28, 30 to 32, 34 to 36, 38 to 40, 42 to 44, 46 to 48, 50 to 52, 54 to 56, 58 to 60, 62 to 64, and 66 to 68).

For example, from comparison between specimen No. 4 using the steel type A and specimen No. 69 using the steel type R, mass decrease can be reduced by 226 mg·cm$^{-2}$, i.e., reduced from 232 mg·cm$^{-2}$ to 6 mg·cm$^{-2}$, showing that a large synergistic effect is seen by specifying the chemical composition and the hardness ratio ($Hv_1/Hv_0$).

As described above, when the steel material composition is selected to be suitable for shot peening treatment onto a steel surface, remarkable improvement is achieved in scale exfoliating resistance associated with the synergistic effect. Consequently, scale exfoliating accompanied with start and stop of a thermal power generation plant is less likely to occur, and blockade of a heat transfer tube and damage of a turbine can be reduced.

While the present invention has been described specifically with reference to the specific embodiment, it will be apparent to those skilled in the art that various modifications or alterations may be made without departing from the spirit and the scope of the invention.

The present application is based on Japanese patent application filed on Dec. 27, 2011 (Japanese Patent Application No. 2011-286431), the content of which is incorporated herein for reference.

INDUSTRIAL APPLICABILITY

The heat-resistant austenitic stainless steel of the invention is useful as a heat transfer tube material for a boiler in a thermal power generation plant, and has excellent scale exfoliating resistance.

The invention claimed is:

1. A heat-resistant austenitic stainless steel comprising iron and:
    C: 0.02 to 0.2% (as determined by mass percent for chemical composition); Si: 0.1 to 1.5%; Mn: 0.1 to 3%; Ni: 7 to 13%; Cr: 16 to 20%; Cu: 0.4 to 4%; Nb: 0.05 to 0.6%, Ti: 0.05 to 0.6%; Zr: 0.05 to 0.35%; Ce: 0.005 to 0.1% B: 0.0005 to 0.005%; N: 0.001 to 0.15%; S: greater than 0% to 0.005%; P: greater than 0% to 0.05%,
    wherein a ratio ($H_{v1}/H_{v0}$) of average hardness ($H_{v0}$) of a region from a surface to a depth of 50 μm in a thickness direction to average hardness ($H_{v0}$) at a center in the thickness direction is 1.20 or more.

2. The heat-resistant austenitic stainless steel according to claim 1, further comprising at least one selected from a group consisting of:
    Co: greater than 0% to 3%; Mo: greater than 0% to 3%; W: greater than 0% to 5%; Ca: greater than 0% to 0.005%; Mg: greater than 0% to 0.005%; V: greater than 0% to 0.6%; Ta: greater than 0% to 0.6%; and Hf: greater than 0% to 0.6%.

3. A stainless steel tube, wherein the stainless steel tube comprises the heat-resistant austenitic stainless steel according to claim 1.

4. The heat-resistant austenitic stainless steel according to claim 1, wherein C: 0.05 to 0.18% (as determined by mass percent); Si: 0.2 to 0.9%; Mn: 0.2 to 2%; Ni: 8 to 12%; Cr: 16.5 to 19.5%; Cu: 1 to 3.7%; Nb: 0.1 to 0.5%;Ti: 0.1 to 0.5%; Zr: 0.1 to 0.3%; Ce: 0.01 to 0.05%; B: 0.001 to 0.004%; N: 0.002 to 0.05%; S: greater than 0% to 0.002%; P: greater than 0% to 0.04%.

5. The heat-resistant austenitic stainless steel according to claim 1, wherein C: 0.09 to 0.15% (as determined by mass percent); Si: 0.3 to 0.8%; Mn: 0.3 to 1.8%; Ni: 9 to 11%; Cr: 17 to 19%; Cu: 1.5 to 3.5%; Nb: 0.15 to 0.3%; Ti: 0.15 to 0.3%; Zr: 0.15 to 0.25%; Ce: 0.015 to 0.03%; B: 0.0012 to 0.003%; N: 0.003 to 0.02%; S: greater than 0% to 0.001%; P: greater than 0% to 0.03%.

6. The heat-resistant austenitic stainless steel according to claim 1, further comprising at least one selected from a group consisting of:
    Co: greater than 0% to 2.5%; Mo: greater than 0% to 2.5%; W: greater than 0% to 4.5%; Ca: greater than 0% to 0.002%; Mg: greater than 0% to 0.002%; V: 0.1% to 0.5%; Ta: 0.1% to 0.5%; and Hf: 0.1% to 0.5%.

7. The heat-resistant austenitic stainless steel according to claim 1, further comprising at least one selected from a group consisting of:
    Co: greater than 0% to 2%; Mo: greater than 0% to 2%; W: greater than 0% to 4%; Ca: greater than 0% to 0.002%; Mg: greater than 0% to 0.002%; V: 0.15% to 0.3%; Ta: 0.15% to 0.3%; and Hf: 0.15% to 0.3%.

8. The heat-resistant austenitic stainless steel according to claim 1, wherein the $H_{v1}/H_{v0}$ ratio is 1.5 or more.

9. The heat-resistant austenitic stainless steel according to claim 1, wherein the $H_{v1}/H_{v0}$ ratio is 1.8 or more.

10. The heat-resistant austenitic stainless steel according to claim 1, wherein the $H_{v1}/H_{v0}$ ratio is 1.2 to 2.5.

11. The heat-resistant austenitic stainless steel according to claim 1, wherein the $H_{v1}/H_{v0}$ ratio is 1.5 to 2.5.

12. The heat-resistant austenitic stainless steel according to claim 1, wherein the $H_{v1}/H_{v0}$ ratio is 1.8 to 2.5.

13. The heat-resistant austenitic stainless steel according to claim 1, wherein the surface of the steel is subjected to shot peening.

14. The heat-resistant austenitic stainless steel according to claim 1, which contains 0.1 to 0.35% of Zr.

15. The heat-resistant austenitic stainless steel according to claim 1, which contains 0.15 to 0.35% of Zr.

16. The heat-resistant austenitic stainless steel according to claim 1, which contains 0.05 to 0.3% of Zr.

17. The heat-resistant austenitic stainless steel according to claim 1, which contains 0.05 to 0.25% of Zr.

18. The heat-resistant austenitic stainless steel according to claim 1, which contains 0.01 to 0.1% of Ce.

19. The heat-resistant austenitic stainless steel according to claim 1, which contains 0.015 to 0.1% of Ce.

20. The heat-resistant ustenitic stainless steel according to claim 1, wherein S: greater than 0% to 0.002%; P: greater than 0% to 0.04%.

* * * * *